(12) United States Patent
Robinson

(10) Patent No.: US 8,061,193 B2
(45) Date of Patent: Nov. 22, 2011

(54) LOW NOISE WIND SHIELD SYSTEM

(76) Inventor: Bruce R. Robinson, San Dia Park, NM (US)

( * ) Notice: Subject to any disclaimer, the term of this patent is extended or adjusted under 35 U.S.C. 154(b) by 59 days.

(21) Appl. No.: 12/657,011

(22) Filed: Jan. 12, 2010

(65) Prior Publication Data

US 2011/0061457 A1  Mar. 17, 2011

Related U.S. Application Data

(60) Provisional application No. 61/276,731, filed on Sep. 16, 2009.

(51) Int. Cl.
  *G01W 1/00* (2006.01)
(52) U.S. Cl. .................................... 73/170.21
(58) Field of Classification Search .......... None
  See application file for complete search history.

(56) References Cited

U.S. PATENT DOCUMENTS

| | | | |
|---|---|---|---|
| 2,112,709 A | | 3/1938 | Reynolds |
| 2,781,227 A | | 2/1957 | Black |
| 3,372,586 A | | 3/1968 | Chadwick |
| 3,487,684 A | | 1/1970 | Chadwick |
| 4,652,206 A | * | 3/1987 | Yeoman .......... 415/4.2 |
| 4,850,792 A | * | 7/1989 | Yeoman .......... 415/4.2 |
| 4,867,499 A | | 9/1989 | Stephan et al. |
| 2005/0126621 A1 | * | 6/2005 | Dinwoodie et al. .......... 136/251 |
| 2009/0320906 A1 | * | 12/2009 | Botkin et al. ................ 136/251 |
| 2010/0179678 A1 | * | 7/2010 | Dinwoodie et al. .......... 700/103 |

OTHER PUBLICATIONS

Written Opinion from the International Searching Authority, International Application No. PCT/US2010/002453, mailed Nov. 18, 2010, 7 pgs. (unnumbered).
Weiss et al., "Precipitation gage shields," (1958), Extr. C.R. Rapp. Assem. Gen. Toronto. 1: 462-484.
Hansen et al., Technology & Development Program (U.S.), (2002), "Windshields for precipitation gauges and improved measurement techniques for snowfall," Missoula, MT: U.S. Dept. of Agriculture, Forest Service, Technology & Development Program, 6 pgs.
"Belfort Model 36001 Double Alter Shield" [Retrieved on Nov. 3, 2010 from: http://www.belfortinstrument.com/_media/client/pdf/meteorologicalsensors/precipitation/AEPG-AlterShield.pdfl], 3 pgs. (unnumbered).

* cited by examiner

*Primary Examiner* — Andre Allen
(74) *Attorney, Agent, or Firm* — Iandiorio Teska & Coleman

(57) ABSTRACT

A meteorological system includes a precipitation gauge and a wind shield subsystem about the precipitation gauge. The wind shield subsystem includes an elevated support member about the precipitation gauge, a plurality of wind deflectors pivotably supported on the support member, and a pivoting attachment between each deflector and the support member. The pivoting attachment is configured to limit the travel of the deflector.

20 Claims, 6 Drawing Sheets

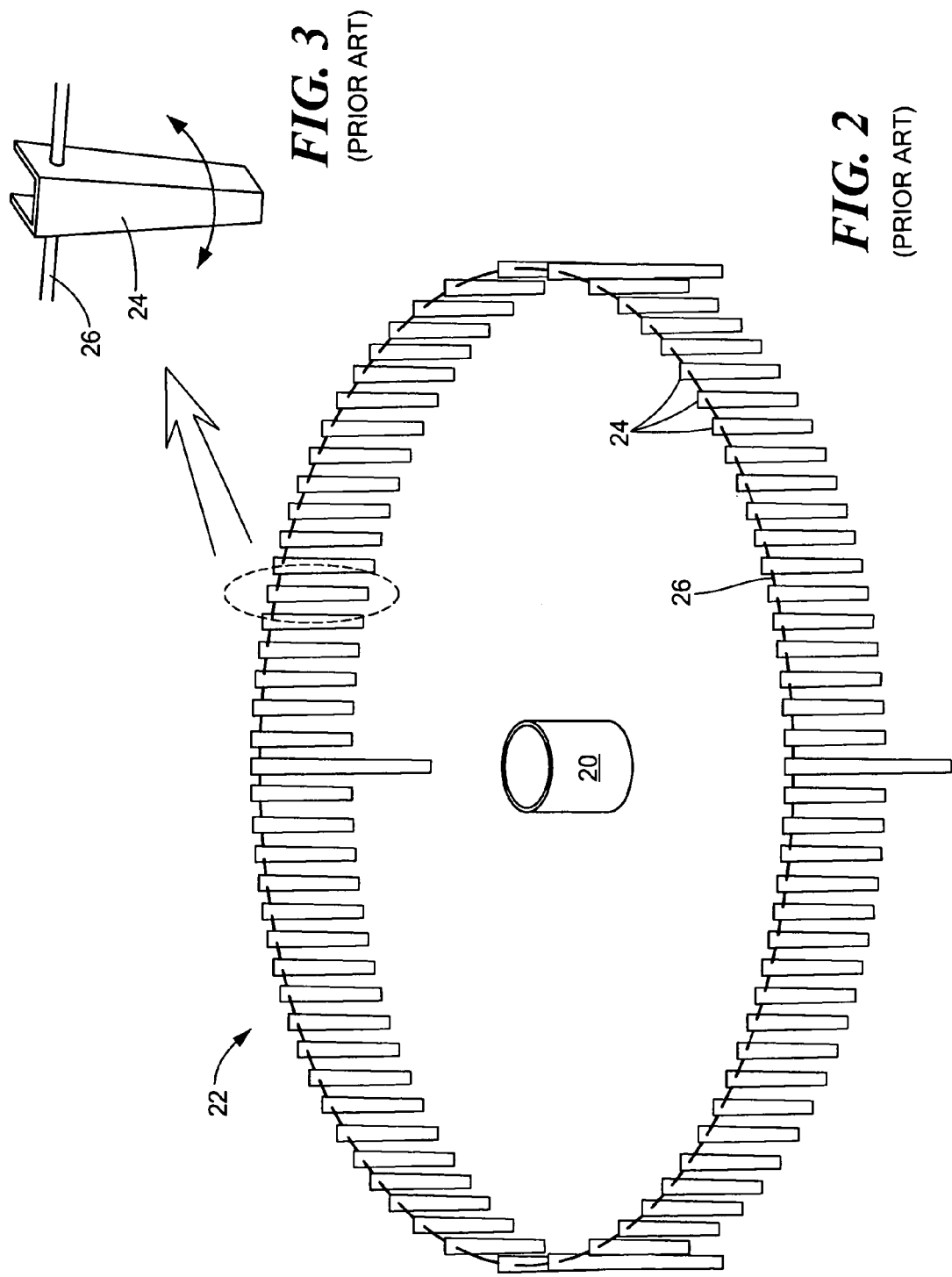

LOW NOISE WIND SHIELD SYSTEM

RELATED APPLICATIONS

This application hereby claims the benefit of and priority to U.S. Provisional Application Ser. No. 61/276,731, filed on Sep. 16, 2009 under 35 U.S.C. §§119, 120, 363, 365, and 37 C.F.R. §1.55 and §1.78.

FIELD OF THE INVENTION

The subject invention relates to a wind shield used with, for example, precipitation gauges.

BACKGROUND OF THE INVENTION

It is known to provide wind shield structures about precipitation gauges. The purpose of the shield is to decrease wind velocity over the top of the precipitation gauge in a way that improves the efficiency and accuracy of precipitation measurement. Studies have shown that modifying the wind flow over and around precipitation measuring instruments reduces the likelihood of precipitation blowing over the top of the precipitation gauge and significantly increases the collection efficiency and accuracy of precipitation measurements.

One prior wind shield structure, called a double fence inter-comparison reference or DIFIR wind shield, includes two concentric fences with spaced apart slats designed to disrupt wind flow over the precipitation collector located at the center of the two concentric fences. This type of a wind shield structure is fairly expensive to install and maintain. Since the individual slats are stationary, the fence is subject to blockage by snow and blowing material.

In an effort to reduce costs and reduce the possibility of deflector blockage by snow and freezing precipitation, another prior "Alter Shield" design includes a moveable deflector fins. Aluminum or plastic wind deflector fins are pivotably mounted on ground support rods and held off the ground at a height slightly above the inlet height of the precipitation gauge by sturdy posts. Such a design, however, is extremely noisy since the wind deflector fins are blown together creating an environmental disruption. The pivoting deflector fins also have a tendency to blow horizontal in high wind conditions and they then become less effective in properly modifying wind flow over the precipitation gauge when most needed.

BRIEF SUMMARY OF THE INVENTION

It is therefore an object of the subject invention to provide a new wind shield system. One preferred wind shield system is quieter and the wind deflectors pivot but only have a limited amount of travel. Such a wind shield system will move less producing less wear.

The subject invention results, in one embodiment, from the partial realization that a better wind shield system includes deflectors pivotably supported on a support member by a pivoting attachment configured to limit the travel of each deflector.

The subject invention features a wind shield system comprising a plurality of wind deflectors pivotably supported on a support member and a pivoting attachment between each wind deflector and the support member configured to limit the travel of the deflectors.

In one example, each wind deflector includes a wall with an opening accepting the support member therethrough. The opening defines spaced stops configured to allow the deflector to pivot on the support member between the two spaced stops. One version of a opening is triangular in shape for a support member rectangular in shape. One preferred wind deflector includes spaced side walls connected by a front wall and there is an opening in each side wall. In another example, each wind deflector includes a front wall and a tab extending upwards from the front wall. The tab then includes the opening.

Typically, the opening or openings include a damping material thereabout. The damping material may include rubber. The wind shield may further include a damping mechanism associated with the pivoting attachment biasing the deflector against pivoting and sliding with respect to the support member. In one example, the damping mechanism includes a spring extending between the deflector and the support member.

The deflectors can be made of metal or plastic and the support member is also typically made of metal or plastic.

One version of a wind shield deflector in accordance with the subject invention includes a front wall and a pair of spaced side walls extending rearwardly from the front wall. All the walls are preferably rectangular in shape. Each side wall includes an upper opening accepting a support member therethrough. Each opening is configured to allow but limit pivoting of the deflector on the support member.

One preferred version of a wind shield deflector includes a front wall, and a pair of spaced side walls extending rearwardly from the front wall. Each side wall includes an upper triangular opening accepting a support member with a cross section defining a quadrilateral therethrough to allow but limit pivoting of the deflector on the support member. Damping material is preferably disposed about each opening in contact with the support member.

More complete meteorological system in accordance with the invention includes a precipitation gauge and a wind shield subsystem about the precipitation gauge. One preferred wind shield subsystem includes an elevated support member about the precipitation gauge, a plurality of wind deflectors pivotably supported on the support member, and a pivoting attachment between each deflector and the support member configured to limit the travel of the deflector.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 2 is a schematic view showing an example of a prior wind shield system with moveable deflector fins;

FIG. 3 is a schematic three-dimensional front view showing the configuration of one of the wind deflectors of the system shown in FIG. 2;

DETAILED DESCRIPTION OF THE INVENTION

Figure 1:
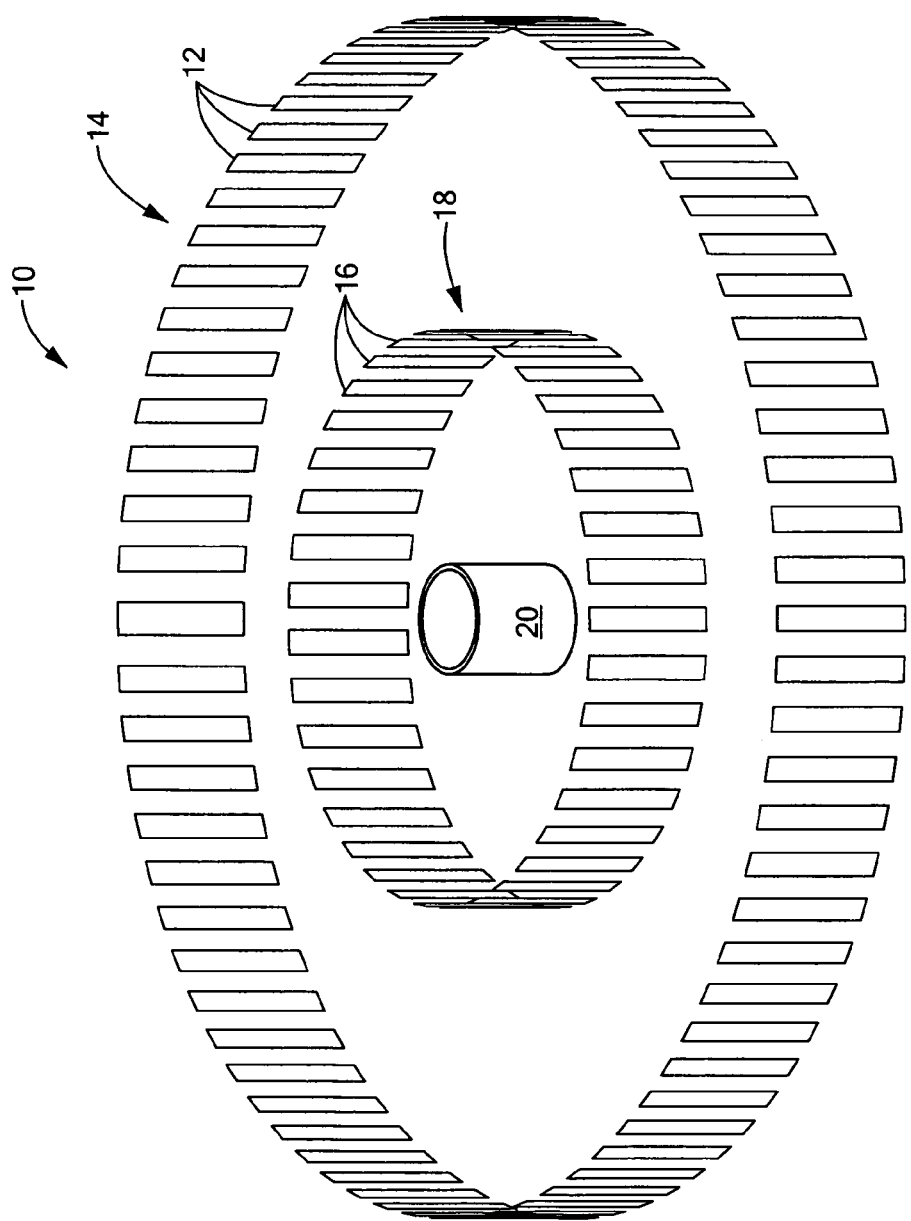
FIG. 1 is a schematic view showing one example of a prior art wind shield system, namely a typical double fence inter-comparison reference wind shield system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of a prior art DFIR wind shield system 10 in accordance with the prior art where fixed slats 12 of outer fence 14 as well as fixed slats 16 of inner fence 18 surround precipitation collector 20. Since the slats 12 and 16 are fixed, fences 14 and 18 are subject to blockage by snow and blowing material. Moreover, such a system is fairly expensive to install.

FIG. 2 shows another prior art fence 22 surrounding precipitation collector 20 wherein each slat 24 is pivotably supported on support hoop, ring, or rod 26, FIG. 3. Such an "Alter Shield" system is less expensive but the unconstrained pivoting shields 24 are extremely noisy when the wind blows and they also have a tendency to move to a horizontal position, if not all the way around support rod 26, in high wind conditions. When this occurs, fence 22, FIG. 2 is much less effective in modifying the wind flow over precipitation gauge 20. Note also that shield 24, FIG. 3 is tapered. The reason for this tapered design is to minimize contact with adjacent deflectors when a deflector is blown inward on the supporting hoop. Because of this tapered design, additional air is allowed to flow between adjacent deflectors limiting the effectiveness of the system.

Figure 4:
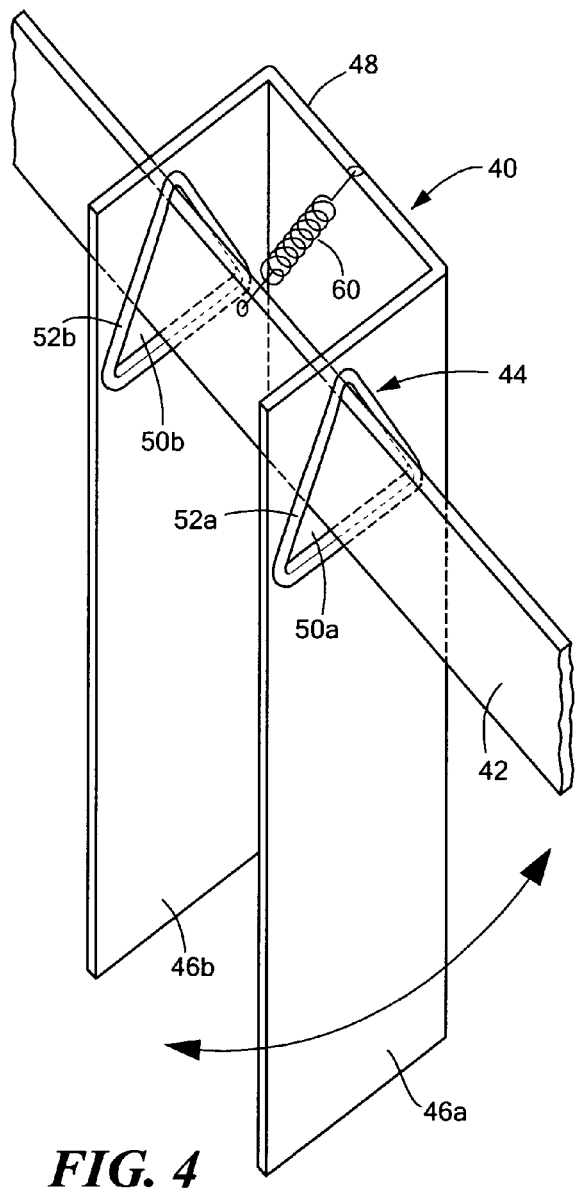
FIG. 4 is a schematic three-dimensional rear view showing one example of a wind deflector pivotably supported on a support member in accordance with the subject invention.

FIG. 4 shows an example of a new wind deflector 40 pivotably supported on support member 42 in accordance with the subject invention. There is typically a plurality of such wind deflectors encompassing a precipitation collector or gauge. Preferably, the wind deflectors are spaced off the ground in a manner similar to the system shown in FIG. 2. There is a pivoting attachment 44 between deflector 40 and support member 42 configured to limit the travel of deflector 40. In the specific example shown in FIG. 4, deflector 40 includes spaced side walls 46a and 46b connected by front wall 48 and there are openings 50a and 50b in each side wall 46a and 46b, respectively. As shown, openings 50a and 50b are triangular in shape and support member 42 is rectangular in shape. Other shapes are possible provided the openings define spaced stops configured to allow deflector 40 to pivot on support member 42 between the two spaced stops. As shown in this particular example, support member 42 is rectangular in shape and may be made of stainless steel, plastic, or the like. Deflector 40 may be made of aluminum, plastic, or the like. The rectangular shape of deflector 40 is advantageous since it blocks more wind than a tapered design (see FIG. 3). The limited pivoting of each deflector and the limited sliding on the support road allows the use of a rectangular construction and also enables a closer spacing between adjacent deflectors to direct more wind away from the collecting orifice of the precipitation gauge.

Typically, openings 50a and 50b each include damping material 52a and 52b, respectively, thereabout. The damping material may include rubber or plastic, or the like. Damping material 52a and 52b, FIG. 4, results in a system with less noise when deflector shield 48 pivots on support member 42. Bushings 52a and 52b also prevent wear. Spring 60 also assists in reducing wear.

Figure 5:
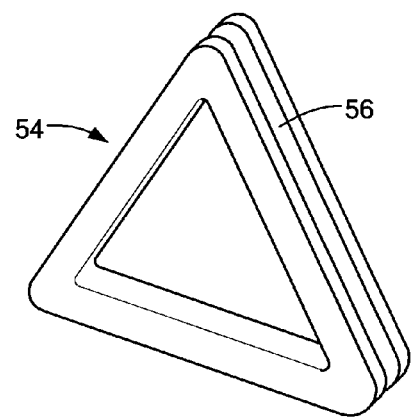
FIG. 5 is a schematic three-dimensional front view showing an example of a damping grommet useful in accordance with the wind shield deflector shown in FIG. 4.

FIG. 5 shows grommet 54 with recess 56 so that it can be inserted into openings 50a and 50b, FIG. 4. In one preferred embodiment, there is also a damping mechanism biasing deflector 40 against pivoting and sliding with respect to support 42. In the example shown, one damping mechanism is spring 60, FIG. 4 extending between deflector front wall 48 and support member 42. Spring 60 also holds the deflector fin in a configuration such that the apex of openings 50a and 50b are held securely against the top of support member 42. Spring 60 also allows the individual deflectors to be spaced more closely to limit air flow between adjacent deflectors.

Figure 6:
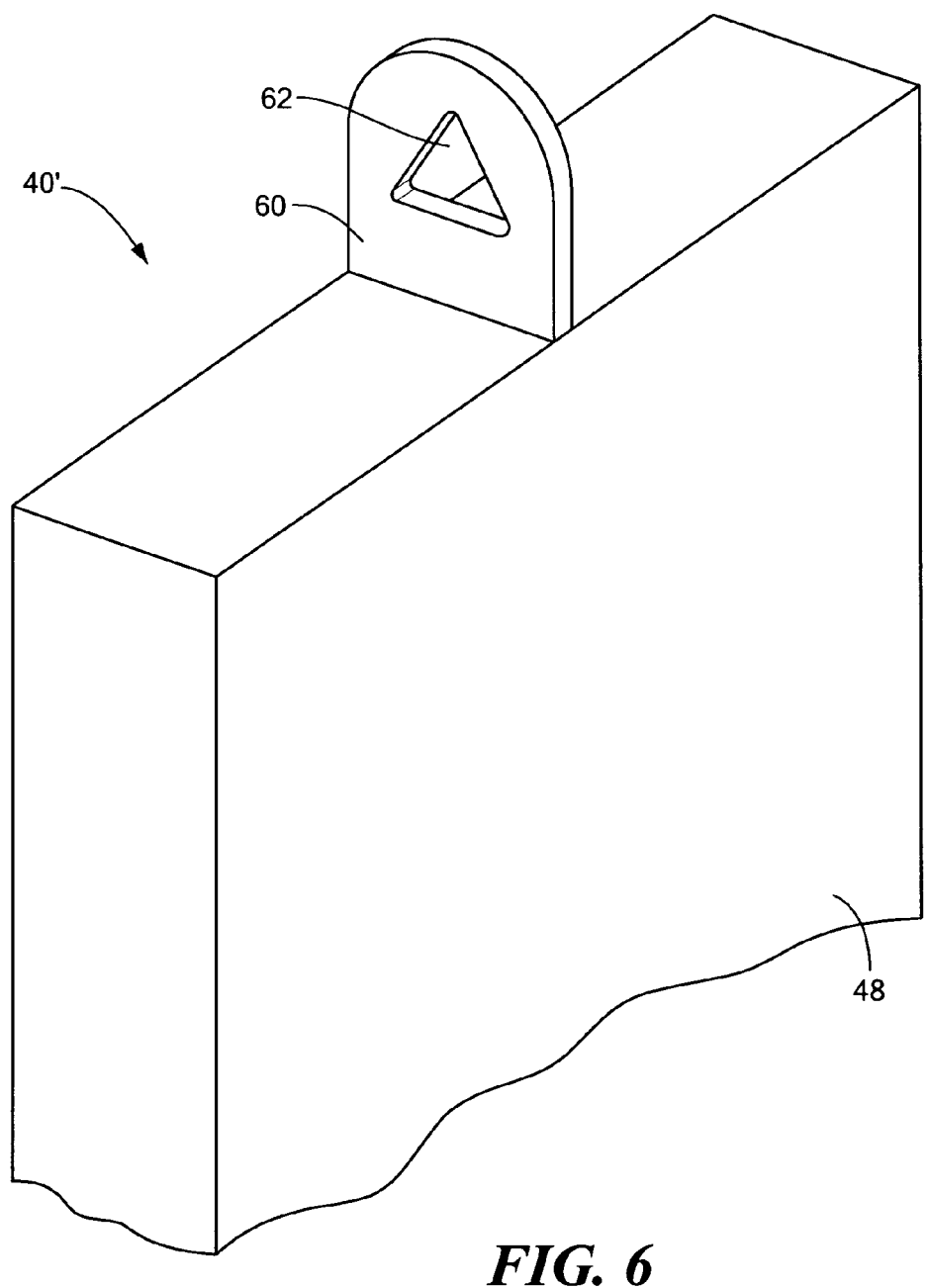
FIG. 6 is a schematic three-dimensional view showing an example of another version of a wind deflector in accordance with the subject invention.

Other designs are possible. For example, in the design shown in FIG. 6, deflector 40' includes front wall 48 and tab 60 extending upwards from front wall 48 as shown. Here, tab 60 includes triangular opening 62 for accepting, for example, rectangular support rod 42, FIG. 4, therethrough. Various means are possible for preventing such a design from sliding on the support rod and/or dampening rotation of the deflector. Bushings on opposite sides of tab 60 are one example. Or, a flexure such as a spring steel band could extend between tab 60 near opening 62 and the support rod or ring.

Figure 7A:
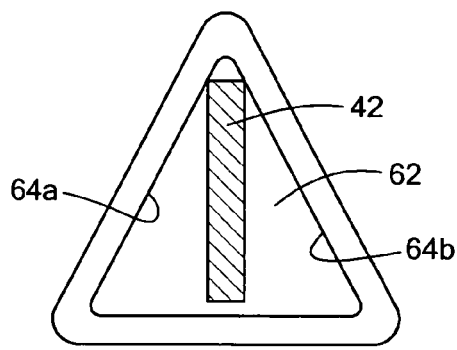
FIG. 7A-C are highly schematic end views showing how, in one example, an individual wind deflector is pivotably supported on a support member in a way that the travel of the deflector is limited.
Figure 7B:
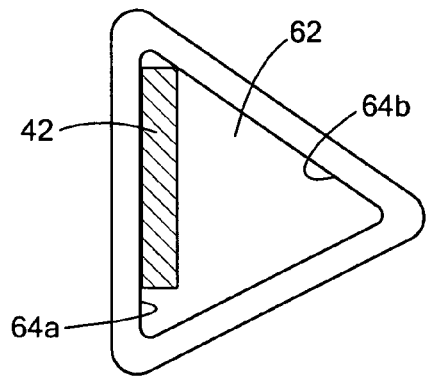
Figure 7C:
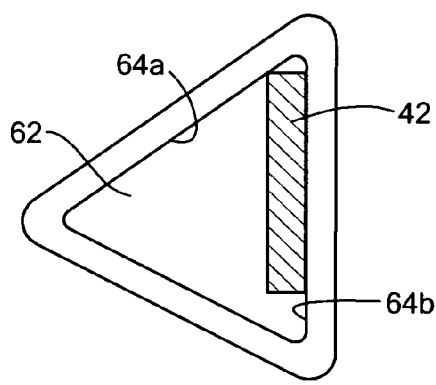

FIG. 7A shows how triangular opening 62 allows the wind deflector to pivot in a limited fashion on support member 42. Opening 62 defines stops 64a and 64b. As shown in FIG. 7B, the deflector has pivoted to the right but is now constrained against further movement as support member 42 abuts stop 64a. In FIG. 7C, the deflector has pivoted to left but now abuts stop 64b thus constraining any further travel of the deflector.

Figure 8:
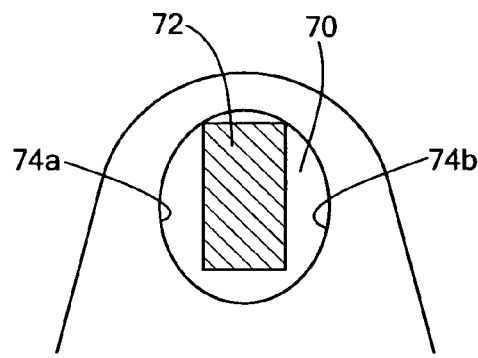
FIG. 8 is a highly schematic side view showing another configuration of a wind deflector pivoting attachment in accordance with the subject invention.

The triangular shape of the opening or openings in the deflector and the rectangular shape shown for the support member, however, are not limitations of the subject invention. FIG. 8, for example, shows a more or less oval shaped opening 70 and quadrilateral (e.g., square) support member 72 designed to allow the deflector to pivot on support member 72 but still limiting the travel of the deflector via stops 74a and 74b. Other designs for the deflectors, their opening (s), and the support members will occur to those skilled in the art.

A more complete meteorological system in accordance with the subject invention would include a precipitation gauge fully surrounded by a plurality of the pivoting but limited travel wind shield deflectors as disclosed herein.

In one preferred embodiment, the pivoting attachment between each deflector and a support member limits the travel of the deflector to plus or minus 30° to maintain adequate deflection over the precipitation gauge during high wind conditions.

Figure 9:
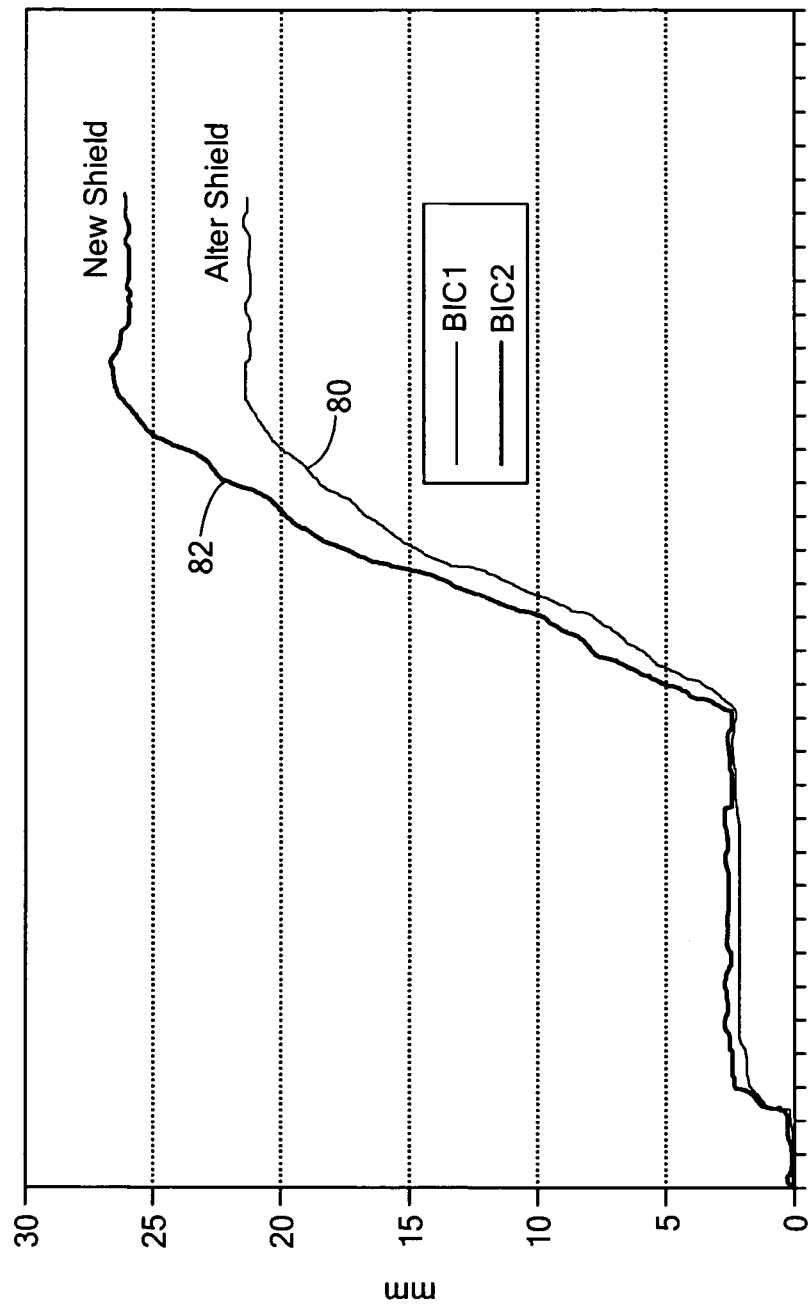
FIG. 9 is a graph showing precipitation collected over time for both the prior art shield construction of FIGS. 2-3 and the shield construction of FIG. 4 in accordance with the subject invention.

FIG. 9 shows at 80 precipitation collected over time for prior art shield 22, FIG. 2 and at 82 the improved collection of precipitation over time for a shield including deflectors 40, FIG. 4, in accordance with the subject invention. The graph represents the accumulative amount of precipitation in mm collected during two snowfall events at a test site. The upper graph shows that 20% more precipitation was collected using the wind shield design that is the subject of this patent application when compared to the commonly used "Alter Shield" design. Both precipitation gauges were identical in this evaluation in configuration except for the surrounding wind shields and located within 100 feet of each other at the test site.

In general, a shield including deflectors 40, FIG. 4 in accordance with the invention matches the performance of the DIFIR shield (FIG. 1) but at a lower cost. A shield in accordance with the subject invention is also easier to install than a DIFIR shield.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A wind shield system comprising:
   a plurality of hanging wind deflectors vertically supported on a horizontal support member; and
   a pivoting attachment between each wind deflector and the support member configured to freely allow pivoting of the deflector but limit the travel of the deflectors.

2. The wind shield system of claim 1 in which each wind deflector includes a wall with an opening accepting the support member therethrough, the opening defining spaced stops and configured to allow the deflector to freely pivot on the support member between the two spaced stops.

3. The wind shield system of claim 2 in which the opening is triangular in shape and the support member is rectangular in shape.

4. The wind shield system of claim 2 in which each wind deflector includes spaced side walls connected by a front wall and there is an opening in each side wall.

5. The wind shield system of claim 4 in which the side walls and front wall are rectangular in shape.

6. The wind shield system of claim 2 in which each wind deflector includes a front wall and a tab extending upwards from the front wall, the tab including said opening.

7. The wind shield system of claim 2 in which the opening includes a damping material thereabout.

8. The wind shield system of claim 7 in which the damping material includes rubber.

9. The wind shield of claim 1 further including a damping mechanism associated with pivoting attachment biasing the deflector against pivoting and sliding with respect to the support member.

10. The wind shield system of claim 9 in which the damping mechanism includes a spring extending between the deflector and the support member.

11. The wind shield system of claim 1 in which each deflector is made of metal or plastic and the support member is made of metal or plastic.

12. A wind shield deflector comprising:
    A vertically extending front wall;
    a pair of spaced side walls extending rearwardly from the front wall;
    each side wall including an upper opening accepting a support member therethrough; and
    each opening configured to freely allow pivoting of the deflector but limit travel of the deflector on the support member.

13. The deflector of claim 12 in which the opening is triangular in shape accepting therethrough a support member rectangular in shape.

14. The deflector of claim 13 in which the opening includes a damping material thereabout.

15. The deflector of claim 14 in which the damping material includes rubber.

16. The deflector of claim 13 further including a damping mechanism biasing the deflector against pivoting and sliding with respect to the support member.

17. The deflector of claim 16 in which the damping mechanism includes a spring extending between the deflector and the support member.

18. The deflector of claim 12 in which the deflector walls are made of metal or plastic.

19. A wind shield deflector comprising:
    a front wall;
    a pair of spaced side walls extending rearwardly from the front wall;
    each side wall including an upper triangular opening accepting a support member with a cross section defining a quadrilateral therethrough to allow but limit pivoting of the deflector on the support member; and
    damping material disposed about each opening in contact with the support member.

20. A meteorological system comprising:
    a precipitation gauge; and
    a wind shield subsystem about the precipitation gauge, the wind shield subsystem including:
        an elevated support member disposed about the precipitation gauge;
        a plurality of wind deflectors pivotably supported on the support member; and
        a pivoting attachment between each deflector and the support member, the pivoting attachment configured to allow pivoting but limit the travel of the deflector.

\* \* \* \* \*